(12) United States Patent
Kang et al.

(10) Patent No.: US 9,501,036 B2
(45) Date of Patent: Nov. 22, 2016

(54) APPARATUS AND METHODS FOR HOLOGRAPHIC DISPLAY

(75) Inventors: Hoonjong Kang, Goyang-si (KR); Fahri Yaras, Ankara (TR); Levent Onural, Ankara (TR)

(73) Assignee: Levent Onural, Ankara (TR)

( * ) Notice: Subject to any disclaimer, the term of this patent is extended or adjusted under 35 U.S.C. 154(b) by 413 days.

(21) Appl. No.: 13/996,557

(22) PCT Filed: Jan. 14, 2011

(86) PCT No.: PCT/IB2011/050180
§ 371 (c)(1),
(2), (4) Date: Oct. 21, 2013

(87) PCT Pub. No.: WO2012/095703
PCT Pub. Date: Jul. 19, 2012

(65) Prior Publication Data
US 2014/0036329 A1    Feb. 6, 2014

(51) Int. Cl.
*G03H 1/08*    (2006.01)
*G02B 5/32*    (2006.01)
(Continued)

(52) U.S. Cl.
CPC .......... *G03H 1/2202* (2013.01); *G03H 1/2294* (2013.01); *G03H 1/26* (2013.01);
(Continued)

(58) Field of Classification Search
CPC ................ G03H 1/2294; G03H 1/0005; G03H 1/08; G03H 1/02; G03H 1/0443; G03H 2001/2242;G03H 1/26; G03H 2001/0216; G03H 2001/221; G03H 1/0841; G03H 1/2249; G03H 2001/2239; G03H 2001/2292; G03H
(Continued)

(56) References Cited

U.S. PATENT DOCUMENTS 5,594,559 A * 1/1997 Sato .................... G03H 1/08
                                                          359/11
6,631,016 B1  10/2003 Klug et al.
(Continued)

FOREIGN PATENT DOCUMENTS

IL    WO 2010004563 A1 * 1/2010 ......... G02B 27/2271

OTHER PUBLICATIONS

International Search Report dated Aug. 24, 2011 for International Appln. No. PCT/IB2011/050180.
(Continued)

*Primary Examiner* — Jade R Chwasz
(74) *Attorney, Agent, or Firm* — Ladas & Parry LLP

(57) ABSTRACT

A holographic display and more particularly an apparatus and method for a curved electro-holographic display are disclosed. The apparatus mainly includes at least one light source for providing lights, at least one axially symmetric mirror for reflecting the lights coming from the light source, at least one spatial light modulation system having one or more than one spatial light modulators for modulating the lights reflecting from the axially symmetric mirror and forming a desired optical reconstruction above the axially symmetric mirror by reflecting the lights which is seen from a viewing zone by the user.

34 Claims, 10 Drawing Sheets

(51) Int. Cl.
*G03H 1/04* (2006.01)
*G03H 1/22* (2006.01)
*G03H 1/26* (2006.01)
*G03H 1/02* (2006.01)

(52) U.S. Cl.
CPC .... *G03H 1/2205* (2013.01); *G03H 2001/0224* (2013.01); *G03H 2001/2242* (2013.01); *G03H 2223/24* (2013.01); *G03H 2225/55* (2013.01); *G03H 2225/60* (2013.01)

(58) Field of Classification Search
CPC ............... 2001/2297;G03H 2222/34; G03H 2225/60; G03H 1/2202; G03H 2001/0224; G03H 1/2205; G03H 2223/24; G03H 2225/55
USPC ....... 359/8, 9, 10, 11, 13, 14, 15, 21, 22, 35
See application file for complete search history.

(56) References Cited

U.S. PATENT DOCUMENTS

2007/0247687 A1* 10/2007 Handschy ................ G03H 1/02
                                                              359/35
2009/0002787 A1*  1/2009 Cable .................... G03H 1/2294
                                                              359/9
2009/0128872 A1*  5/2009 Christmas .............. G02B 27/54
                                                              359/9
2010/0165429 A1   7/2010 Buckley et al.

OTHER PUBLICATIONS

Written Opinion dated Aug. 24, 2011 for International Appln. No. PCT/IB2011/050180.
International Preliminary Report on Patentability dated Jul. 18, 2013 for International Appln. No. PCT/IB2011/050180.
J. Hahn et al., "Wide viewing angle dynamic holographic stereogram with a curved array of spatial light modulators," Optics Express, OSA (Optical Society of America), vol. 16, No. 16, Aug. 4, 2008, pp. 12372-12386.
M. Stanley et al., "3D Electronic Holography Display System Using a 100 Mega-Pixel Spatial Light Modulator", vol. 5249, pp. 297-308, Proc. of SPIE, 2004.

* cited by examiner

APPARATUS AND METHODS FOR HOLOGRAPHIC DISPLAY

RELATED APPLICATION INFORMATION

This application is a 371 of International Application PCT/IB2011/050180 filed 14 Jan. 2011 entitled "An Apparatus And Methods For Holographic Display", which was published in the English language 19 Jul. 2012, with International Publication Number WO 2012/095703 A1, the contents of which are incorporated herein by reference.

FIELD OF THE INVENTION

The present invention relates to a holographic display and more particularly to an apparatus and methods for a curved electro-holographic display.

BACKGROUND OF THE INVENTION

Holographic displays are means of generating realistic reconstruction of a three-dimensional ("3-D") object or scene, because they can provide the required depth cues corresponding to the 3-D object or scene exactly. Using holographic techniques, the wave front reflected from an object may be recorded by means of a light sensing device through light interference with a reference wave, or generated based on numerical computation using a suitable numerical model. A recorded wave front may also be reconstructed through light diffraction through use of a spatial light modulator ("SLM"). As a result of such operations, the 3-D object or scene may be regenerated volumetrically at another location.

Holographic information is encoded in the complex amplitude of the light field. Even through complex valued data cannot be directly written on the currently available SLMs, phase-only SLMs or amplitude-only SLMs have been used as dynamic holographic displays. Nevertheless, such SLMs are not yet capable of reaching acceptable performance levels. For example, the space-bandwidth product of commercially available pixelated SLMs is quite small compared to conventional light-sensitive materials used for holographic recording.

Several techniques have been reported for overcoming these obstacles as below.

M. Stanley, M. A. G. Smith, A. P. Smith, P. J. Watson, S. D. Coomber, C. D. Cameron, C. W. Slinger, and A. D. Wood, *3D Electronic Holography Display System Using a 100 Mega-Pixel Spatial Light Modulator*, Volume 5249, pp. 297-308, Proc. of SPIE, 2004. [QinetiQ]

J Hahn, H. Kim, Y. Lim, G. Park and B. Lee, *Wide Viewing Angle Dynamic Holographic Stereogram With a Curved Array of Spatial Light Modulators*, Opt. Express, 16(16): 12372-12386, 2008. [Seoul Univ.]

Michael A. Klug, and Mark E. Holzbach, *Full-parallax holographic stereograms on curved substrates*, U.S. Pat. No. 6,631,016. [Zebra Imaging, Inc.]

Edward Buckley, and Diego Gil-Leyva, *Optical systems*, United States Patent 2010/0165429. [Light Blue Optics Ltd.]

The QinetiQ approach sequentially employs two SLMs, an electrically-addressed spatial light modulator ("EA-SLM") and an optically-addressed spatial light modulator ("OASLM"). The EASLM, which has one million pixels, is used to display synthetic fringe patterns, whereas replication optics is used to magnify and tile onto the OASLM the patterns to be displayed. Through use of an electrical shutter in the optics, each fringe pattern is simultaneously projected on an associated segment of the OASLM at a given time. This system uses a Ferro liquid crystal display (FLCD) whose switching time is much shorter than that of a typical LCD, such as that used as the EASLM. In this way, an output per channel of 26 million pixels has been achieved on a 5×5 matrix of SLMs in an OASLM implementation. The space-bandwidth product is increased through use of the two different SLMs and replication optics. However, such an approach is suitable only for planar configurations due to the geometry of the replication optics; in particular, this approach is not suitable for curved display devices.

A curved display configuration with multiple SLMs based on a holographic stereogram approach has been presented by Lee et al. This system was implemented with twelve SLMs, wherein each SLM had a corresponding transfer lens and two mirror modules that divided the diffracted light from the SLM into three partitions that were then recombined in a form three times wider (although the height of the reformed SLM image was reduced). Therefore, the effective number of SLMs was 36. Their approach was based on a horizontal parallax only ("HPO") holographic stereogram in which an asymmetric diffuser was used as a screen. Using this method, they achieved a viewing angle of approximately 22.8 degrees with a continuous viewing zone. However, such an approach may not be suitable for commercial applications, because the design of the light illumination optics for multiple SLMs is very complex, and because a cylindrical configuration that has a 360 degree continuous viewing zone cannot be implemented. Furthermore, this technique is not suitable for full parallax holographic display, because of the reduced vertical resolution on the SLM plane. Given these deficiencies of the prior art, there is a need for a SLM-based display device that has a curved configuration.

A holographic stereogram recording method have been reported by Michael A. Klug et al. at Zebra Imaging Inc. so as to display a desired three-dimensional object by a hologram that is mounted on a curved substrate where the hologram is full parallax, one-step recording and full color holographic stereogram. The hologram, which can be mounted on an arbitrary shaped substrate, is partitioned by one or more tiles, and each tile is comprised of one or more holographic elements. A plurality of hogels is recorded on the tile by varying at least one of a holographic element orientation corresponding to a desired three-dimensional object. Therefore, the major advantage of such hologram is that the hologram can be formed in arbitrary shapes due to the hologram tiling and tiles mounting on an arbitrary shaped substrate individually. On the contrary to this, one of the disadvantages of this hologram is that it can display only still three-dimensional image due to the recording of holographic elements on a photo-refractive material.

Even though such approach can provide the three-dimensional representation holographically, it may not be proper for a moving object display for example a holographic-TV and holographic video.

A holographic head up display for displaying an image on a curved surface such as a windshield of a vehicle was presented by Edward Buckley et al. at Light Blue Optics Ltd. The holographic head up display can be comprised of a spatial light modulator (SLM), a projection system, and a computing system. Due to the various shapes of the windshield of a vehicle, the corresponding wave front correction data is recorded in the non-volatile data memory in the computing system as initialization in order to display the image on the curved surface without shape distortion. The desired two-dimensional images and the recorded wave front correction data are used to generate corresponding fringe patterns. The generated fringe patterns are displayed over the SLM, and a plane wave is illuminated over the SLM. The modulated light by the SLM is projected on the curved surface by the projection system. In this system, the holographic techniques are applied to correct the displayed image for aberration or shape distortion due to a shape of a display surface. Therefore, a windshield or other curved surface can be used as an image screen to provide a two-dimensional image holographically to an observer. However such system can be applicable to only two-dimensional image display on a curved surface. In other words, the presented system may not be suitable to display a three-dimensional object in a space and its viewing angle is also restricted by the projection system.

OBJECTS AND SUMMARY OF THE INVENTION

The object of the invention is to provide an apparatus and methods for an axially symmetric electro-holographic display through use of an axially symmetric mirror, wherein the axially symmetric mirror reflects incident light axially symmetrically onto multiple planar SLMs forming a curved configuration and wherein the device permits free user movement without degradation in perception of the viewed image.

A further object of the invention is to provide an apparatus and methods for an improved axially symmetric electro-holographic display that includes relay lens modules to render the SLM plane virtually continuous and for providing a continuous viewing zone to the user.

A further object of the invention is to provide an apparatus and methods for providing an axially symmetric configuration for generating holographic fringe patterns using plane waves or spherical waves as the illuminating light beam.

Accordingly, one embodiment of the present invention provides an apparatus for displaying holographic images using a curved display device. The apparatus includes a light source that produces either a coherent light beam or an incoherent light beam. A collimator optical system collimates the light beam and directs the collimated light beam to an axially symmetric mirror. The collimated light beam is reflected by the axially symmetric mirror and propagates over the entire radial range for axially symmetric illumination of an axially symmetrically configured SLM layer, which consists of multiple SLMs. The diffracted light beam from each SLM is superposed with the diffracted light beams from the other SLMS above the axially symmetric mirror. In an embodiment, the SLMs do not include blocking SLM mounts and comprise only active area on their exposed surfaces. The desired optical reconstruction takes place above the axially symmetric mirror for viewing by a user.

Another embodiment of the present invention provides an apparatus for displaying holographic images using a curved display device. The apparatus includes a light source that produces either a coherent light beam or an incoherent light beam. A collimator optical system collimates the light beam and directs the collimated light beam to an axially symmetric mirror. The collimated light beam is reflected by the axially symmetric mirror and propagates over the entire radial range for axially symmetric illumination of an axially symmetrically configured SLM layer, which consists of multiple planar SLMs. The diffracted light beam from each SLM is superposed with the diffracted light beams from the other SLMS above the axially symmetric mirror. The SLMs of this embodiment include mounts that protect their respective active areas. Consequently, the area between the active areas of adjacent SLMs comprises portions of their mounts, which form inactive areas. The diffracted light beam from each SLM is relayed and magnified by a relay optical system so that only the active area of the SLM is reimaged at a certain distance. Thus, the hologram that is generated based on the active areas of the SLMs at the relevant distance from each SLM is equivalent to one generated by a continuous SLM layer. In particular, the hologram supports a continuous viewing zone. In this embodiment, superposition of the diffracted light beams from the multiple SLMs takes place above the axially symmetric mirror, providing an image above the axially symmetric mirror for viewing by the user.

Another embodiment of the present invention provides an apparatus for displaying holographic images using a curved display device. The apparatus includes a light source that produces ether a coherent light beam or an incoherent light beam. A collimator optical system collimates the light beam and directs the collimated light beam to an axially symmetric mirror. The collimated light beam is reflected by the axially symmetric mirror and propagates over the entire radial range and is eventually directed onto a curved SLM layer comprising a plurality of planar SLMs. Each planar SLM is associated with a compensation lens and beam splitter. A radially directed light beam from the axially symmetric mirror propagates through a compensation lens, which generates a plane wave. The plane wave is then incident upon a beam splitter. The beam splitter directs the plane wave onto the corresponding SLM. The SLMs, which each include a mount, are aligned in a curved and (due to the blind spots arising from portions of mounts between adjacent SLMs) segmented configuration. The diffracted light beam from each SLM is relayed and magnified by a relay optical system so that the image from the active area of the SLM is projected at a desired distance. Thus, the image from each SLM that is projected is equivalent to an image generated by a continuous SLM layer. The diffracted light beam from each SLM is directed above the axially symmetric mirror that forms an image for viewing by the user.

An axially symmetric configuration for a curved holographic display can be achieved with multiple planar SLMs and an axially symmetric mirror. The diffracted light beams from each SLM over a segmented axially symmetric configuration of SLMs may be superposed above the axially symmetric mirror, through the use, for example, of a relay optical system. In this way, a display that has an Omni directional and continuous holographic viewing zone is feasible. Thus, the holographic display can provide the user with an Omni directional and continuous viewing zone that permits freedom of user movement along the horizontal plane.

The foregoing is a summary and thus contains, by necessity, simplifications, generalizations and omissions of details; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, features, and advantages of embodiments of the present invention, as defined solely by the claims, will become apparent in the non-limiting and detailed description set forth below.

DETAILED DESCRIPTION OF THE INVENTION

An apparatus and methods for holographic display realized in order to fulfill the objects of the present invention is illustrated in the attached figures, where:

Figure 1:
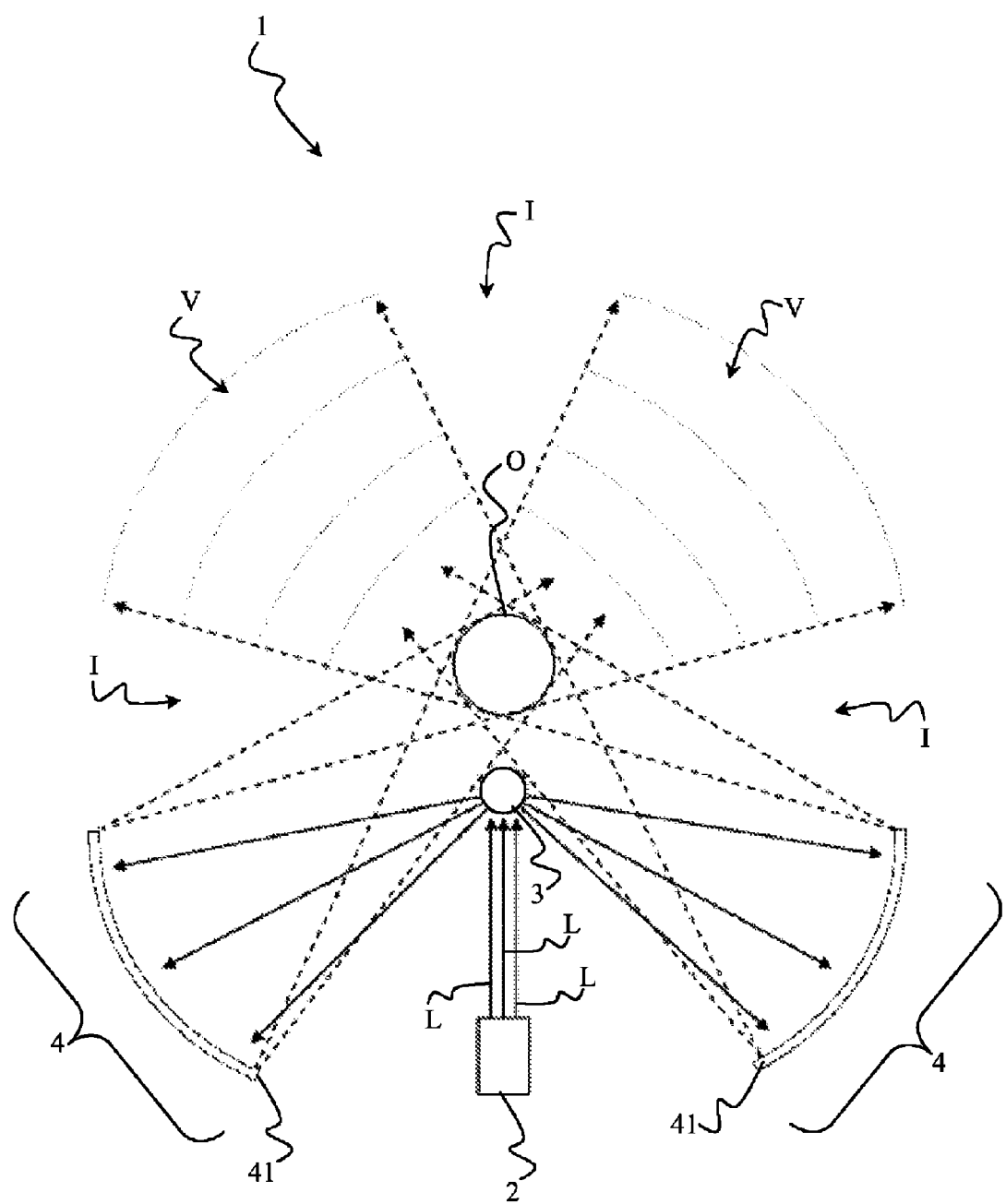
FIG. 1 shows a cross-sectional view of an axially symmetric holographic display in accordance with an embodiment of the invention.

Elements shown in the figures are numbered as follows:
1. Apparatus for holographic display
2. Light source
3. Axially symmetric mirror
    31. Cone mirror
    32. Planar mirror
4. Spatial light modulation system
    41. Spatial light modulator
        411. Protective mount
        412. Active area
    42. Relay optical system
        421, 422. Lens
    43. Compensation lens
    44. Beam splitter
5. Collimator optical system
    51, 52. Lens
    53. Pinhole
G. Gap
I. Invisible zone
L. Light
O. Optical reconstruction
R. Re-imaged active area
U. User
V. Viewing zone An apparatus (1) for holographic display comprises;
at least one light source (2) for providing source light beam,
at least one axially symmetric mirror (3) for reflecting the source light beam coming from light source (2),
at least one spatial light modulation system (4) having one or more than one spatial light modulators (41) for modulating lights (L) reflecting from the axially symmetric mirror (3) and forming a desired optical reconstruction (O) above the axially symmetric mirror (3) by reflecting the lights (L) which is seen from a viewing zone (V) by the user (U).

The following sets forth a detailed description of the best contemplated mode for carrying out the invention. The description is intended to be illustrative of the invention and should not be taken to be limiting.

The following are definitions for some terms used herein to describe aspects of embodiments of the apparatus (1) that has a curved configuration.

A "fringe pattern" is a holographic pattern that is either recorded optically based on one or more physical objects or that is generated computationally, and which may be used to diffract light (L) to form an image. The spatial light modulation system (4) is configured in accordance with a holographic fringe pattern configuration. Holographic fringe pattern configuration comprises a plurality of holographic fringe patterns, each of the plurality of holographic fringe patterns being associated with a corresponding planar spatial light modulator (41) from among the plurality of planar spatial light modulators (41). At least one of the holographic fringe patterns is dynamically modified.

A "hologram" refers to either an interference pattern that is generated through the interference of a wave reflecting from a physical object with a reference wave, or to the optical reconstruction (O) (such as a ghost-like optical duplicate of a 3D object or scene) that is generated by light (L) diffracted from a fringe pattern.

"Angle of Incidence" is the angle formed between a ray incident on a surface and the line perpendicular to the surface at the point of incidence.

"Object wave" refers to the light (L) scattered from an object that may be recorded on a hologram for later reconstruction.

"Reference wave" refers to either the light (L) that is used, in conjunction with light (L) reflecting from a physical object, to generate a fringe pattern that is a holographic recording, or to the light (L) that is directed at a fringe pattern to generate the image recorded by the fringe pattern. In embodiments, the reference wave used for generation of a holographic image has the same optical characteristics (such as wavelength and angle of incidence) as the reference wave used to generate the fringe pattern.

"Spatial light modulator (41)" or "SLM (41)" refers to devices known to those of ordinary skill in the art that modulate an incident light beam.

"Spatial frequency" refers to the average number of slits per unit distance of a grating. The International System of Units ("SI") unit for spatial frequency is cycles per millimeter.

The apparatus (1) and methods of the embodiments described below rely for generation of holographic information on either the numerical computation of holographic fringe patterns or the acquisition of real fringe patterns through interference of an object light beam containing desired three-dimensional information with a reference light beam. The computed or generated fringe patterns are downloaded to display apparatus' (1) hardware such as a set of SLMs (41), and the fringe patterns are subsequently loaded onto the axially symmetrically configured multiple SLMs (41).

The human visual system will observe continuous motion if the frame rate of a moving picture exceeds 24 frames per second (fps). Therefore, for a dynamic apparatus (1), the fringe patterns for SLMs (41) should be updated more than 24 frames per second. Apparatus (1) and methods for updating fringe patterns on SLMs (41) at least at this rate are well known to those of ordinary skill in the art.

Figure 2:
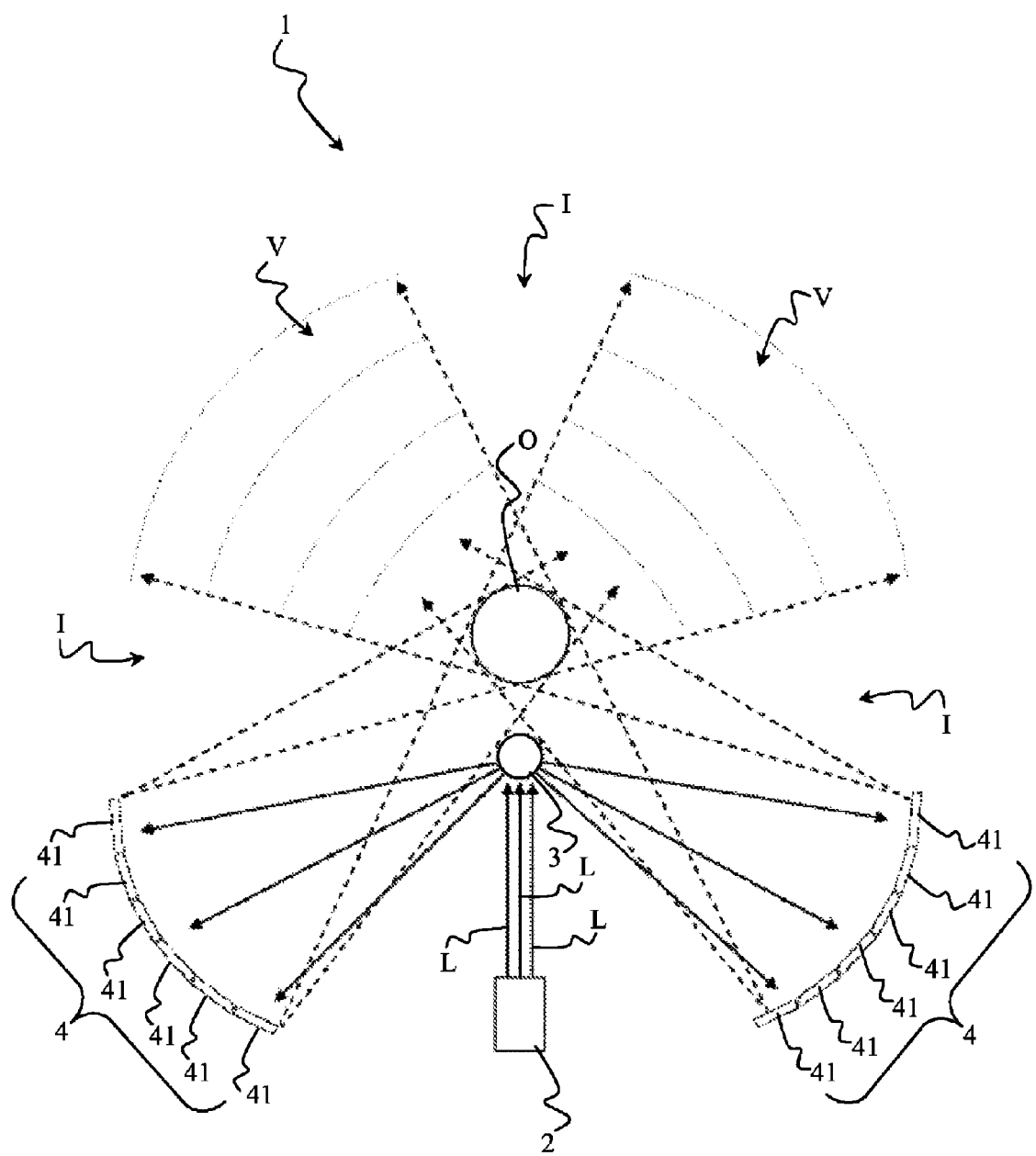
FIG. 2 shows a cross-sectional view of an axially symmetric holographic display in accordance with an embodiment of the invention that includes a plurality of planar SLMs.

FIG. 1 is a schematic diagram depicting a cross-section of the apparatus (1) for axially symmetric holographic display model. The primary purpose of this model is to provide a 360 degree viewing zone (V) with proper depth and permitting free movement of the user (U). The main components of the apparatus (1) are the light source (2), the spatial light modulation system (4) consists of one or more than one spatial light modulators (41) (only a cross section of which has been depicted in FIG. 1 and which, for example, may form a rotationally symmetric active surface about the axis defined by the source light beam), and the axially symmetric mirror (3). The light (L) from light source (2) (which may generate visible and/or non-visible frequencies) is reflected on the axially symmetric mirror (3), and propagated onto the parabolic spatial light modulators (41). The light (L) incident upon the parabolic SLM (41) is diffracted by a holographic fringe pattern loaded on the parabolic SLM (41). The diffracted light (L) from the parabolic SLM (41) is superposed above the axially symmetric mirror (3), and forms a desired optical reconstruction (O) above the mirror (3) in accordance with the information contained in the holographic fringe pattern. The user (U) may thus observe the optical reconstruction (0) within the viewing zone (V) as depicted in FIG. 1. This configuration provides an exact optical reconstruction (O) with a continuous viewing zone (V). However, such a large and continuous parabolic SLM (41) is not yet commercially available at a reasonable price. In an alternative aspect of this embodiment, spatial light modulation system (4) consists of a plurality of planar SLMs (41) may instead be used to form a SLM (41) layer or system (4) by tiling the planar SLMs (41) along a surface. FIG. 2 illustrates such an alternative aspect that utilizes a plurality of planar SLMs (41). The multiple planar SLMs (41) are tiled and tilted to form, for example, a parabolic SLM (41) surface (only a cross section of which has been depicted in FIG. 2 and which, for example, may form a rotationally symmetric active surface, except for the gaps (G) between adjacent planar SLMs (41), about the axis defined by the source light beam). Although this SLM (41) surface is partitioned and not continuous because it comprises a plurality of discrete planar SLMs (41), the tiled multiple SLMs (41) of the spatial light modulation system (4) may still provide an optical reconstruction (O) that is almost exact and a viewing zone (V) that is virtually continuous. The plurality of planar spatial light modulators (41) are arranged in a configuration selected from the group comprising a cylindrical, a partially spherical and a conical configuration, wherein the configuration has a central axis substantially parallel or collinear with an axis of symmetry of the axially symmetric mirror (3).

Although the apparatus (1) in this embodiment is depicted as having only one light source (2), it may alternatively be constructed with several different light sources (2) (or a single light source providing light beam output at multiple wavelengths) to enable color holographic display in a color interlacing manner.

In certain embodiments, a continuous wave laser, a light emitting diode ("LED") and a halogen lamp may be used as a light source (2) for display of the hologram. The light source (2) is selected from the group comprising a coherent light source and an incoherent light source. Laser light (L) is spatially coherent. The laser light (L) reflecting from the axially symmetric mirror (3) onto each of the planar SLMs (41) is diffracted and propagated along the direction determined by the geometry of that SLM (41). The result is an optical reconstruction (0) that may be viewed by the user (U). However, the mutual interference of a set of wave fronts from the laser light (L) may cause speckle noise, which is visible on the desired optical reconstruction (O). Therefore, the apparatus (1) that uses a laser as a light source (2) may (unless speckle noise is filtered or otherwise handled using methods known to those of ordinary skill in the art) be unsuitable for the human visual system. The use of a LED light source (2) with a narrow band-pass filter may provide a better optical reconstruction (O) that is free from speckle noise and whose quality is comparable to that generated based on a laser light source (2).

The spatial light modulation system (4) illustrated in FIG. 2 is a reflective spatial light modulation system (4) that rotates the polarization direction of the incident light beam. In general, different types of SLMs (41) may be used in embodiments of the invention, including a transmissive liquid crystal display ("LCD") panel, a reflective LCD panel, a liquid crystal on silicon ("LCoS") panel and/or a digital micro-mirror array. Furthermore, a phase-only SLM (41), an amplitude-only SLM (41), a complex-amplitude SLM (41), an optically addressed SLM (41) and/or an electrically addressed SLM (41) may also be used in embodiments.

For the axially symmetric mirror (3), any mirror with axial symmetry, such as a ball (or partially spherical) mirror or a parabolic mirror, may be used to reflect light (L) onto the parabolic SLM (41) surface comprising a continuous curved surface SLM (41) or tiled multiple SLMs (41). Additionally, a cone mirror (31) may also be used in an embodiment comprising a single SLM (41) or a plurality of SLMs (41) in a cylindrical configuration. Such a configuration may also provide a 360 degree viewing zone (V). Furthermore, in other embodiments, substantially axially symmetric mirrors (3) may also be used, with or without correction for the deviation from axially symmetric. A mirror that is not axially symmetric or substantially axially symmetric (for example, a mirror whose surface is distorted or contains other defects) may also be used, as long as the distortion generated by the mirror is corrected using other optical elements or effects in the apparatus (1). For example, as will be apparent to those of skill in the art based on the disclosure in this description, if distortion of the mirror is measured and/or is otherwise known, it may be corrected and/or compensated for by modifying the fringe patterns based on the measured and/or otherwise known distortion.

So, the axially symmetric mirror (3) is selected from the group comprising a partially spherical mirror, a cylindrical mirror and a conical mirror.

Figure 3:
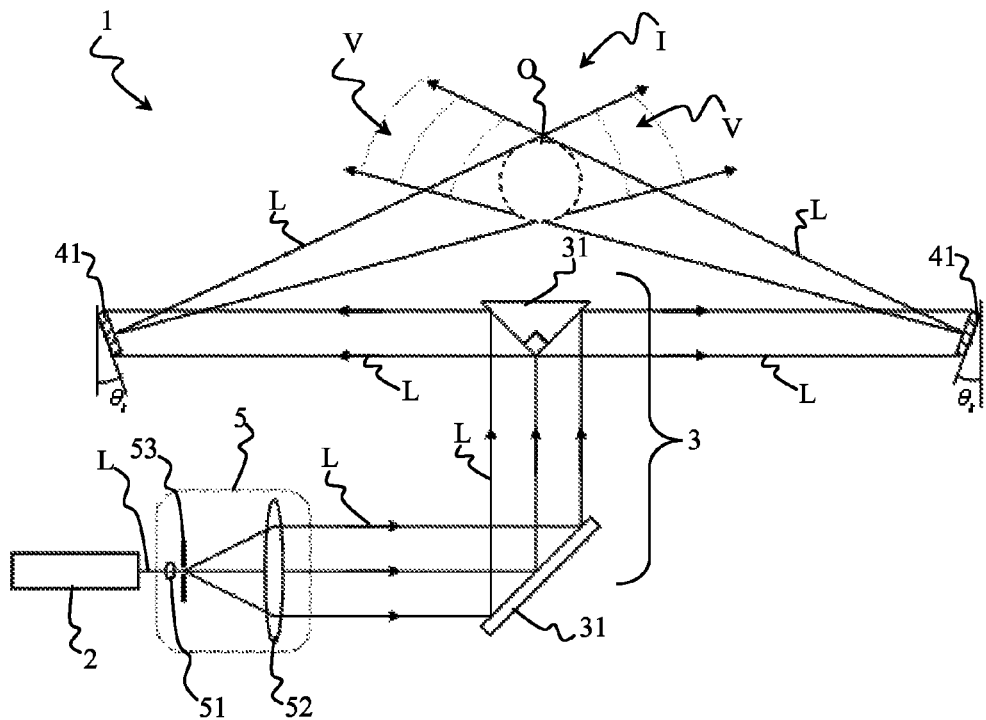
FIG. 3 shows a side view of a cylindrically configured embodiment in which a cylindrical holographic display comprises a light source, a collimator optical system, vertically tilted multiple SLMs that do not include protective mounts and a cone mirror.

FIG. 3 depicts a cone mirror-based cylindrical holographic display apparatus (1) that provides a 360 degree viewing zone (V) and that permits free user (U) movement. The main components of the apparatus (1) are at least one light source (2), at least one collimator optical system (5), at least one axially symmetric mirror (3) having at least one cone mirror (31) and at least one planar mirror (32) and at least one spatial light modulation system (4) having one or more than one cylindrically configured spatial light modulators (41) which each contain an active area (412) covering an entire side of the SLM (41) without any blocking by a SLM (41) protective mount (411) component. The light beam from light source (2) is collimated by collimator optical system (5) that comprises a combination of two lenses (51 and 52) and at least one pinhole (53) for filtering the undesired high spatial frequency components of the light beam. The collimator optical system (5) directs the source light beam substantially parallel to or collinear with the axis of symmetry of the axially symmetric mirror (3). The collimated light beam is reflected by the planar mirror (32) onto cone mirror (31) and it is reflected by the cone mirror (31) onto cylindrically aligned SLMs (41). The light beam components impinging onto each SLM (41) are modulated according to the fringe pattern loaded on that SLM (41). Each SLM (41) is tilted about a horizontal axis by a certain angle (which may be varied) such that the diffracted light (L) from the SLMs (41) is superposed above the cone mirror (31). In this way, a perfect 360 degree hologram viewing zone (V) may be realized.

The axially symmetric holographic display apparatus (1) with multiple planar SLMs (41) requires that a holographic fringe pattern (or a series of holographic fringe patterns) corresponding to each SLM (41) be loaded onto that SLM (41) for optical reconstruction (O) of an image (or a moving picture). For purposes of this application, the one or more holographic fringe patterns that may be loaded onto a spatial light modulation system (4) is referred to as a holographic fringe pattern configuration. The one or more holographic fringe patterns to be loaded onto each SLM (41) in the system (4) may be determined based on numerical computation or real object-based hologram acquisition.

For acquisition based on a real object, digital holograms of the object are acquired at different viewing angles through interference of reference light beams and object light beams that are scattered from the real object. Commonly, a rotating stage is used in acquiring multiple holograms from different angular views. A real object is rotated by a rotating stage, and each hologram corresponding to each SLM (41) is acquired at the corresponding angle. All of the required digital holograms may be acquired by repeating this procedure. Captured fringe patterns may be further processed, probably by employing digital computerized techniques, to filter out possible recording noise and to fine tune the fringe patterns to better fit the SLM (41) geometry and properties.

A computer graphic model may be utilized instead of images of a real object for numerical computation of a digital hologram. Because three-dimensional information from a three-dimensional object is used for computation of a digital hologram, as a first step, point clouds are extracted from a three-dimensional computer graphic model at the associated angular views corresponding to each SLM (41). Then, digital holograms for each SLM (41) are computed using the corresponding point cloud based on a light propagation algorithm. Light propagation algorithms based on the Rayleigh-Sommerfeld integral, the Fresnel integral and so on may be applied at this step, as will be apparent to one of ordinary skill in the art based on this disclosure. The Rayleigh-Sommerfeld integral provides an exact light propagation expression based on scalar diffraction.

The complex amplitude of the object wave in the initial state from a point in a point cloud is $O(x, y, z)=o(x, y, z) \exp[j\theta_o(x, y, z)]$, where $o(x, y, z)$ is the real amplitude and $\theta_o(x, y, z)$ is the phase of the object wave, and $R(x, y, z)=r(x, y, z)\exp[j\theta_r(x, y, z)]$ is the complex amplitude of the reference wave with real amplitude $r(x, y, z)$ and phase $\theta_r(x, y, z)$. The discrete form of Rayleigh-Sommerfeld integral is expressed as:

$$S(\xi, \eta) = \sum_{p=1}^{N} O_p(x, y, z) R_p(x, y, z) \frac{\exp(jkr_p)}{r_p} \quad (1)$$

where, N is the number of points used in the point cloud (with a greater value for N leading to greater computational complexity, but a more accurate recording of the object), p is the index of a point in the point cloud, k is the wave number with $k=2\pi/\lambda$, $\lambda$ is the wavelength, and the distance $r_p$ from $p_{th}$ object point to the hologram plane is given by $[(\xi-x_p)^2+(\eta-y_p)^2+z_p^2]^{1/2}$.

Figure 4:
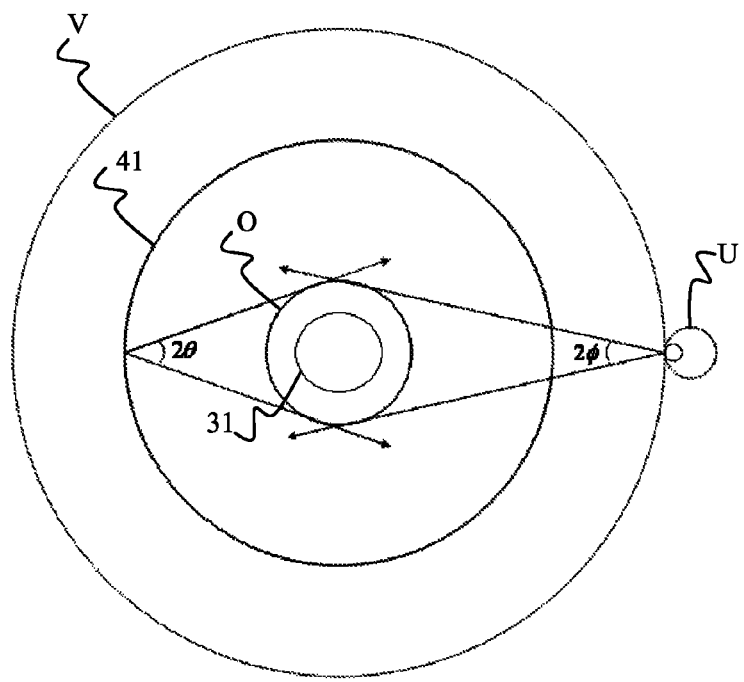
FIG. 4 shows a top view of a cylindrically configured embodiment that provides a continuous viewing zone and that includes a cone mirror, an area for optical reconstruction, and a cylindrically configured SLM layer.

The generated or acquired digital holograms corresponding to each SLM (41) of the axially symmetric configuration are loaded onto the corresponding SLMs (41), and the light (L) reflected from the axially symmetric mirror (3) is diffracted according to the fringe pattern displayed on each SLM (41). The diffracted light beams from the SLMs (41) are superposed above the axially symmetric mirror (3) with the desired volumetric optical reconstruction (O) taking place at the desired location. As seen in FIG. 4, a user (U) may view the optical reconstruction (O) within the viewing zone (V)

Figure 5:
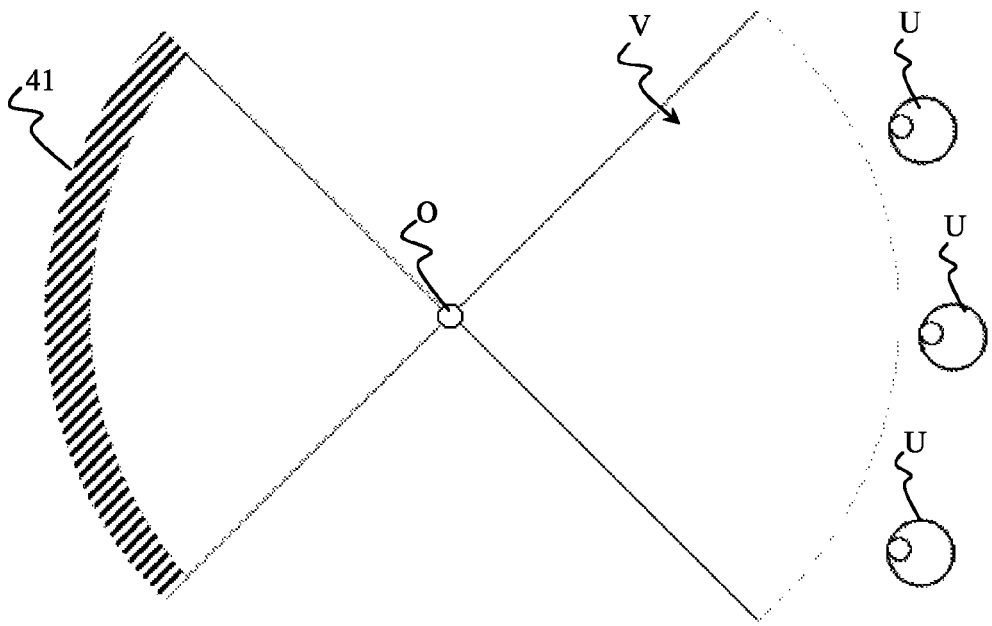
FIG. 5 shows a continuous, single, curved SLM and its resultant continuous viewing zone.
Figure 6:
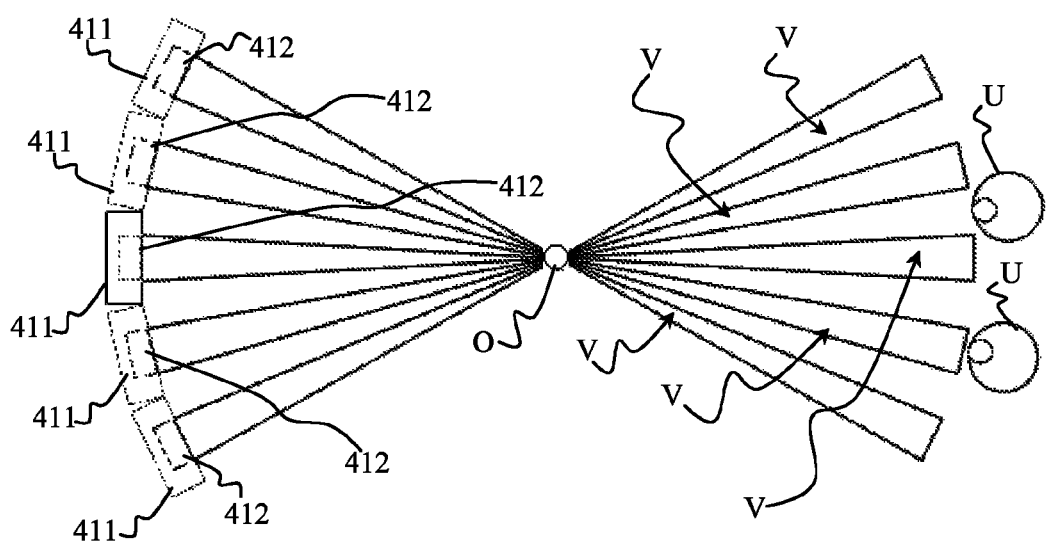
FIG. 6 shows a discontinuous SLM layer that comprises a plurality of planar SLMs and its resultant discontinuous viewing zone.

FIG. 5 depicts an ideal circular spatial light modulation system (4) and the corresponding viewing zone (V). A single continuous SLM (41) as depicted in FIG. 5, which consists of only active area (412) without any protective mount (411), provides a continuous viewing zone (V) allowing convenient viewing of the optical reconstruction (O). However, commercially available SLMs (41) are in general planar and not curved; additionally, such SLMs (41) have protective mounts (411) to protect their active areas (412). FIG. 6 depicts a circular configuration comprising a plurality of planar SLMs (41) that each includes a protective mount (411). The gaps (G) between active areas (412) in adjacent SLMs (41) due to the edges of the protective mounts (411) of the SLMs (41) results in blind spots and part of the viewing zone (V) is being unavailable, and thus leads to a discontinuous viewing zone (V). This may cause discomfort for the user (U) while viewing the optical reconstruction (O).

Figure 7:
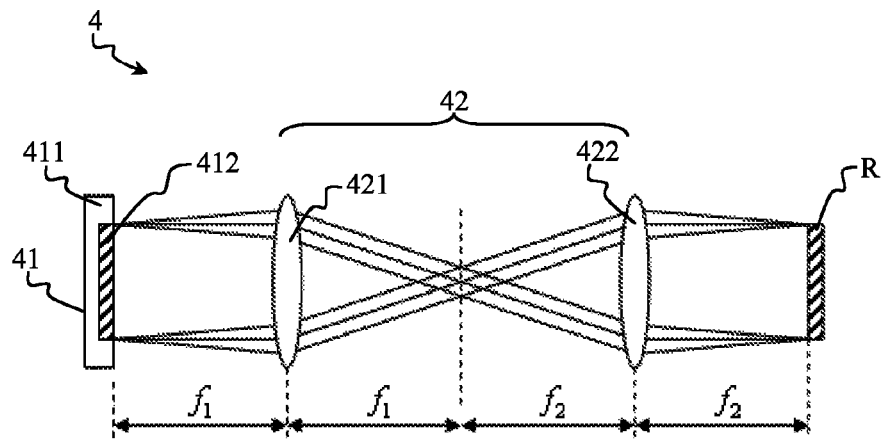
FIG. 7 shows a relay lens module comprising two lenses.

In an embodiment, a relay optical system (42) may be used to overcome this drawback. In this embodiment, al least one relay optical system (42) comprises two lenses (61 and 62). As depicted in FIG. 7, the image from the fringe patterns of the SLMs (41) are re-imaged at certain desired distance by the two lenses (61 and 62) in a way that eliminates the blind spots caused by the edges of the protective mounts (411) and results in a continuous viewing zone (V). The magnification provided by lenses (61 and 62) for the fringe pattern from a SLM (41) is given by:

$$M = \frac{f_2}{f_1},\qquad(2)$$

where $f_1$ is the focal length of the first lens (421), $L_1$, and $f_2$ is the focal length of the second lens (422), $L_2$. Thus, a relay optical system (42) may be advantageously used in embodiments of the invention.

Figure 8:
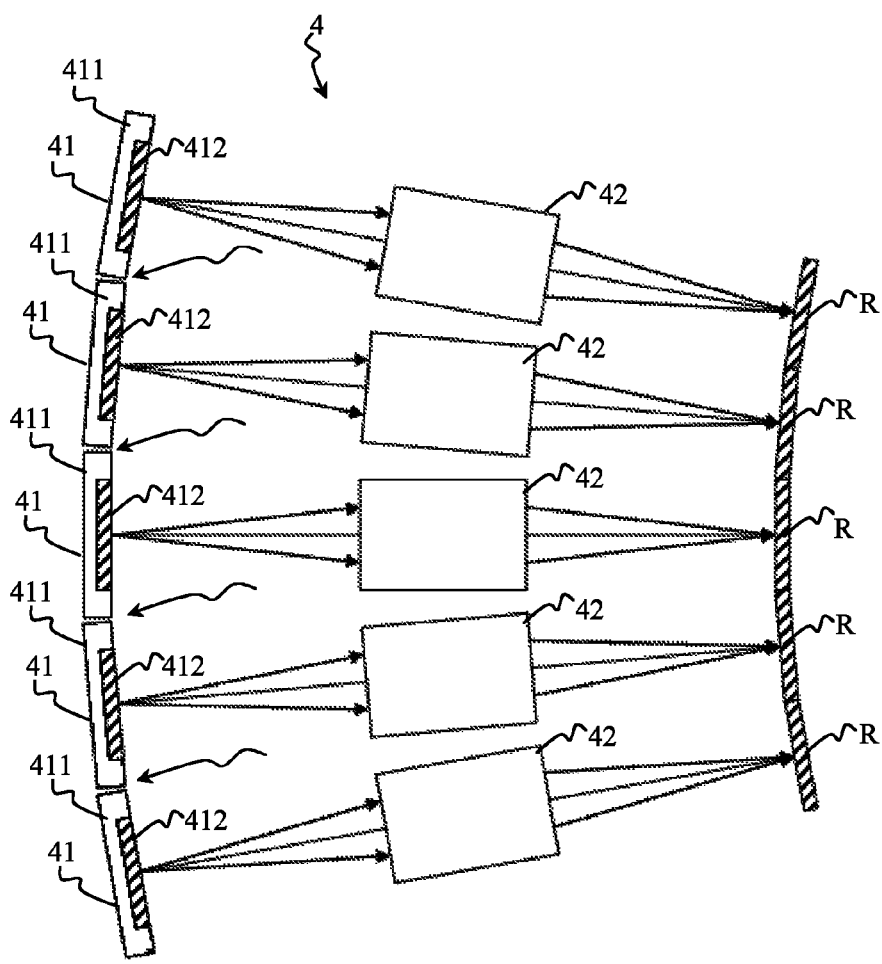
FIG. 8 shows an aspect of an embodiment in which relay lens modules are used with SLMs that have protective mounts to provide an effectively continuous viewing zone.

FIG. 8 depicts an embodiment that includes a continuous spatial light modulation system (4) having a plurality of tiled planar SLMs (41) and a plurality of relay optical systems (42). As depicted, a physical spatial light modulation system (4) comprising a plurality of planar SLMs (41) with protective mounts (411), with a relay optical system (42) corresponding to each SLM (41) of the spatial light modulation system (4), may be used to effectively form a curved and continuous SLM (41) layer which is named re-imaged active area (R).

Figure 9:
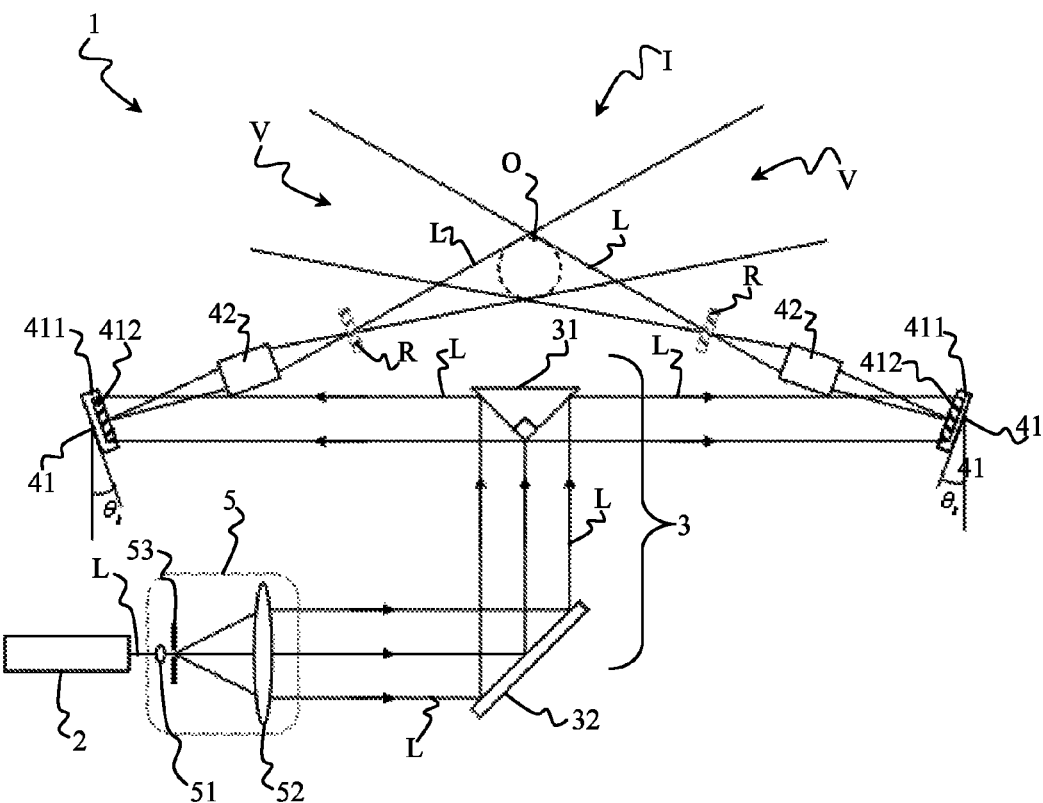
FIG. 9 shows a side view of a cylindrically configured embodiment of a cylindrical holographic display that comprises a light source, a collimator optical system, vertically tilted SLMs that each has protective mounts, a cone mirror and, for each of SLMs, a corresponding relay lens module.

FIG. 9 depicts another embodiment of a cone mirror-based cylindrical holographic display apparatus (1) that provides a 360 degree viewing zone (V) and that permits free user (U) movement. The main components of the apparatus (1) are at least one light source (2), at least one collimator optical system (5), at least one axially symmetric mirror (3) having at least one cone mirror (31) and at least one planar mirror (32) and at least one spatial light modulation system (4) consists of a plurality of planar SLMs (41) that have protective mounts (411) and, for each planar SLM (41) of the plurality, at least one relay optical system (42). The main components of this apparatus (1) are similar to those of the apparatus (1) illustrated in FIG. 3. However this modified apparatus (1), despite its use of mounted SLMs (41), provides an effectively continuous SLM (41) layer through use of the relay optical systems (42). In the apparatuses (1) illustrated in FIGS. 3, and 9, the SLMs (41) are tilted about a horizontal axis so that the diffracted light (L) from each SLM (41) is directed above the cone mirror (31). For large tilting angles, some undesired noise may arise from propagation of light (L) through the tilted liquid layer of a liquid-based SLM (41). However, if the tilting angle is sufficiently small, the quality of optical reconstruction (0) may not be adversely impacted.

The apparatus (1) and methods described in embodiments of the present invention use an axially symmetric mirror (3) for reflection of light (L) onto one or more SLMs (41). The quality of the optical reconstruction (0) in a holographic display apparatus (1) that uses an axially symmetric mirror (3) may be worse than for an apparatus (1) that uses a planar mirror (32) and hence produces a plane wave, because the light beam that impinges upon each SLM (41) after reflection from a partially spherical or cylindrical (i.e., axially symmetric) mirror will be a cylindrical or spherical wave. The use of non-planar waves may result in a spatial frequency bandwidth restriction. The reason is that the whole range of the spatial frequency bandwidth is restricted by the pixel interval of the used SLM (41), and when the reference wave is a plane wave (i.e., light impinges perpendicularly on the SLM), the whole range of the spatial frequency bandwidth can be allocated for the object. However, when a partially spherical or cylindrical mirror is used, the light (L) reflected by the mirror is a spherical wave that has a corresponding spatial frequency bandwidth. Therefore, the available range of the spatial frequency bandwidth for the object is then restricted due to the allocated spatial frequency bandwidth for the spherical reference wave. In that case, the quality of the optical reconstruction (O) may be worse. The maximum spatial frequency that may be modulated by a SLM (41) is $f_{max}=1/(2\Delta p)$, where $\Delta p$ is the pixel interval of the SLM (41). When the reference wave impinges at a certain angle upon the SLM (41), the spatial frequency, $f_{obj}$, corresponding to an object point is given by:

$$f = \frac{\sin\theta_{obj} - \sin\theta_{ref}}{\lambda},\qquad(3)$$

where, $\theta_{obj}$ is the angle of incidence of the light (L) from an object point, and $\theta_{ref}$ is the angle of incidence of the reference wave. Using an axially symmetrically generated reference wave, the available maximum spatial frequency $f_{max\_obj}$ is, $f_{max\_obj}=f_{max}-f_{max\_ref}$, where $f_{max\_ref}$ is the maximum spatial frequency of the reference wave.

Figure 10:
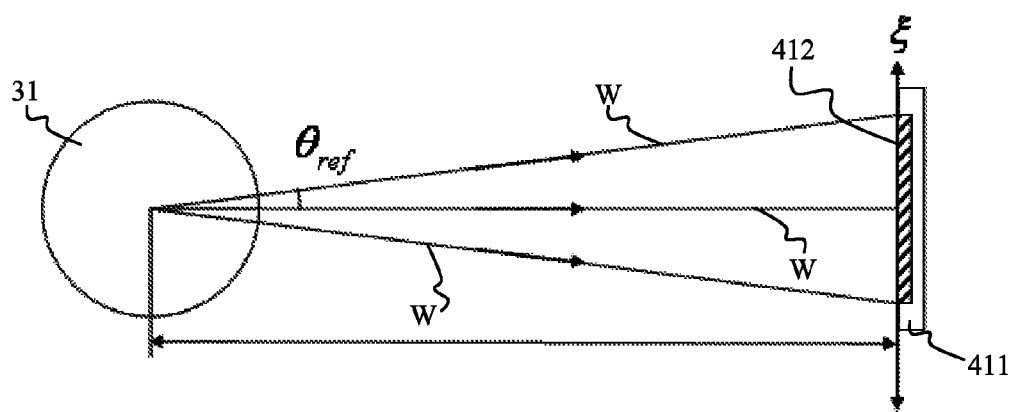
FIG. 10 shows a top view of an asymmetric spherical wave that is generated by reflection from a cone mirror and that is incident upon an SLM.

FIG. 10 depicts a view from the top of an embodiment that includes a cone mirror (31) in a cylindrical configuration. The plane wave that impinges upon the cone mirror (31) is reflected and propagated isotropically along all radial directions.

Thus, the reflected wave that impinges upon a SLM (41) may be regarded as a spherical wave whose diameter, $D_l$, is the distance between the SLM (41) and the center of the cone mirror (31). The complex amplitude of the reference wave along the horizontal direction, $R(\xi)$, is given by:

$$R(\xi) = \exp\left(jk\frac{\xi^2}{2D_l}\right),\qquad(4)$$

Figure 11:
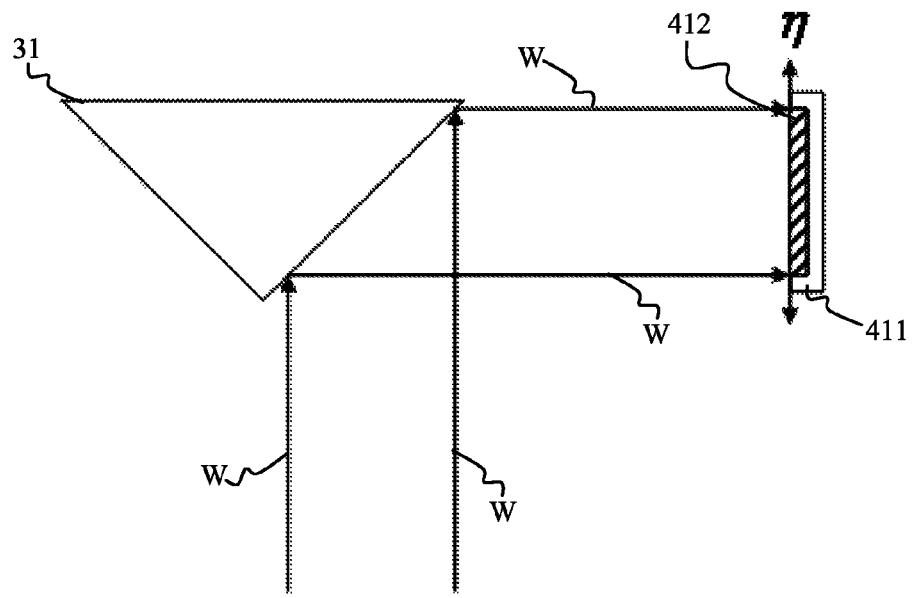
FIG. 11 shows a side view of a plane wave that is generated by reflection from a cone mirror and that is incident upon a SLM.
Figure 12:
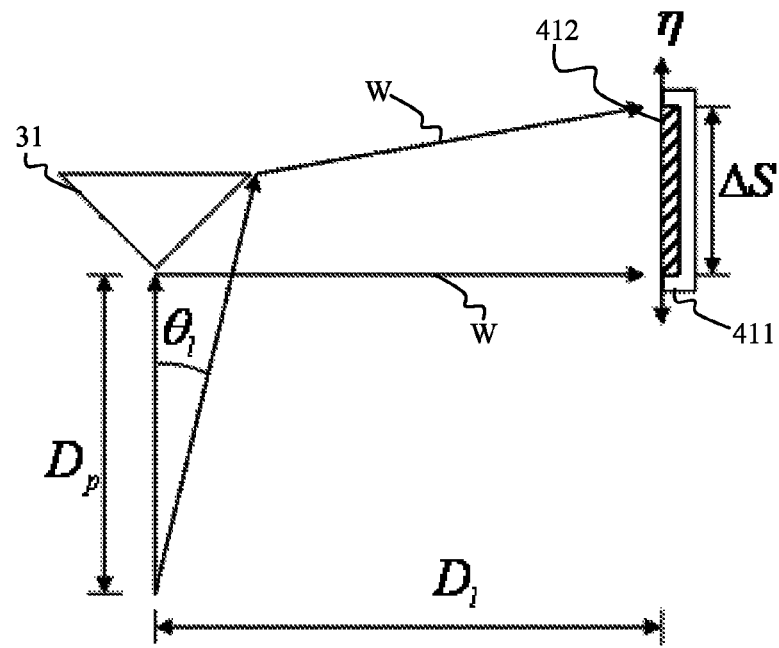
FIG. 12 shows a side view of a spherical wave that is generated by reflection from a cone mirror and that is incident upon a SLM.

Considering the vertical direction as depicted in FIG. 11, the plane wave impinging upon the cone mirror (31) is reflected and impinges upon SLM (41) as depicted in FIG. 11. Because the surface of the cone mirror (31) along the vertical direction is a slanted flat plane, the properties of the wave impinging upon the mirror (31) are not changed upon reflection from the cone mirror (31). Thus, if the wave impinging upon the cone mirror (31) is a plane wave, the wave that is reflected by the cone mirror (31) and that impinges upon the SLM (41) is also a plane wave. In order to illuminate the entire active area (412) of SLM (41), the height of the cone mirror (31) should be greater than the height of the SLM (41). However, even if the height of the cone mirror (31) is less than that of the SLM (41), spherical wave illumination as depicted in FIG. 12 may overcome such disadvantages. In that case, the center of the spherical reference wave that impinges on the SLM (41) is the same as that of the spherical wave impinging on the cone mirror (31). Therefore, a variety of axially symmetric mirrors (3) may be utilized in such an axially symmetric configuration even when the height of the cone mirror (31) is smaller than that of the SLM (41). The complex amplitude of the spherical reference wave along the vertical direction, $R(\eta)$, is given by:

$$R(\eta) = \exp\left[jk\frac{\left(\eta+\frac{\Delta S}{2}\right)^2}{2(D_p+D_l)}\right],\qquad(5)$$

where, $\Delta S$ is the height of the SLM (41), and $D_p$ is the distance between the cone mirror (31) and the center of the spherical reference wave.

Figure 13:
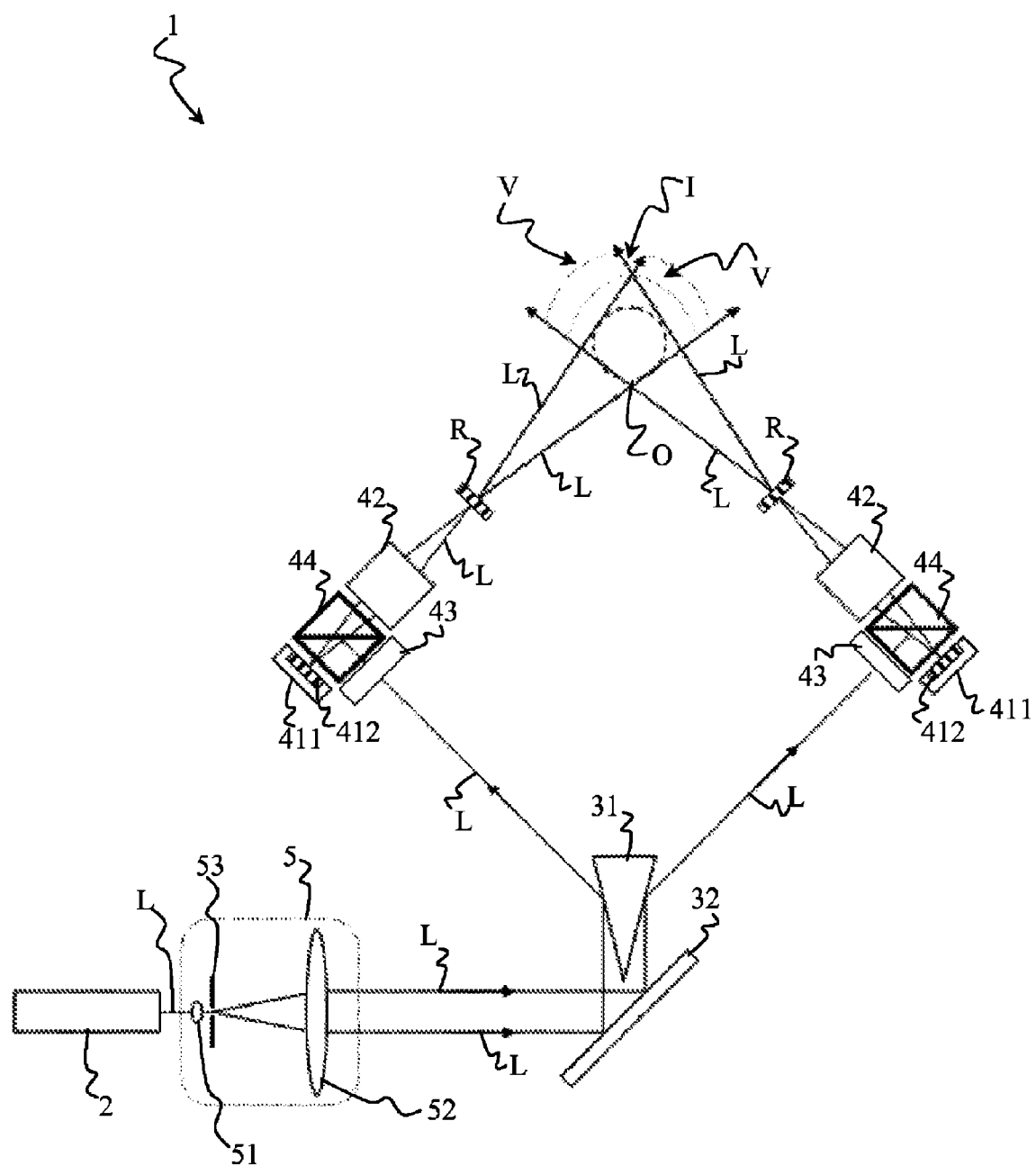
FIG. 13 shows a side view of a cylindrically configured embodiment for holographic display which uses compensation lenses and beam splitters to direct a plane wave on each SLM of the holographic display.

FIG. 13 depicts an embodiment that includes a cylindrical configuration, which may overcome degradation of the quality of the image. The main components of this cylindrical holographic display apparatus (1) are at least one light source (2), at least one collimator optical system (5), at least one axially symmetric mirror (3) having at least one cone mirror (31) and at least one planar mirror (32), at least one spatial light modulation system (4) having at least one compensation lens (43), at least one beam splitter (44), one or more than one cylindrically configured spatial light modulators (41) which each contain an active area (412) covering an entire side of the SLM (41) without any blocking by a SLM (41) protective mount (41) component and at least one relay optical system (42). The light beam from light source (2) is collimated by a light beam collimator optical system (5) and reflected by the cone mirror (31) onto each SLM (41). The cylindrical wave that is reflected from the cone mirror (31) is converted to a plane wave by the compensation lens (43) in a way that compensates for the restricted spatial frequency bandwidth of the cylindrical wave. This plane wave is then reflected onto a corresponding SLM (41) by the beam splitter (44). Each SLM (41) modulates the light beam impinging perpendicularly upon it based on the diffraction pattern loaded onto that SLM (41). In this embodiment, the planar SLMs (41) are aligned without any tilting. The diffracted light beam from each SLM (41) is re-imaged by a corresponding relay optical system (42), and the diffracted light beams are superposed above the cone mirror (31). As a result, the user (U) can view the optical reconstruction (O) in a 360 degree continuous viewing zone (V) that allows for free user (U) movement.

Figure 14:
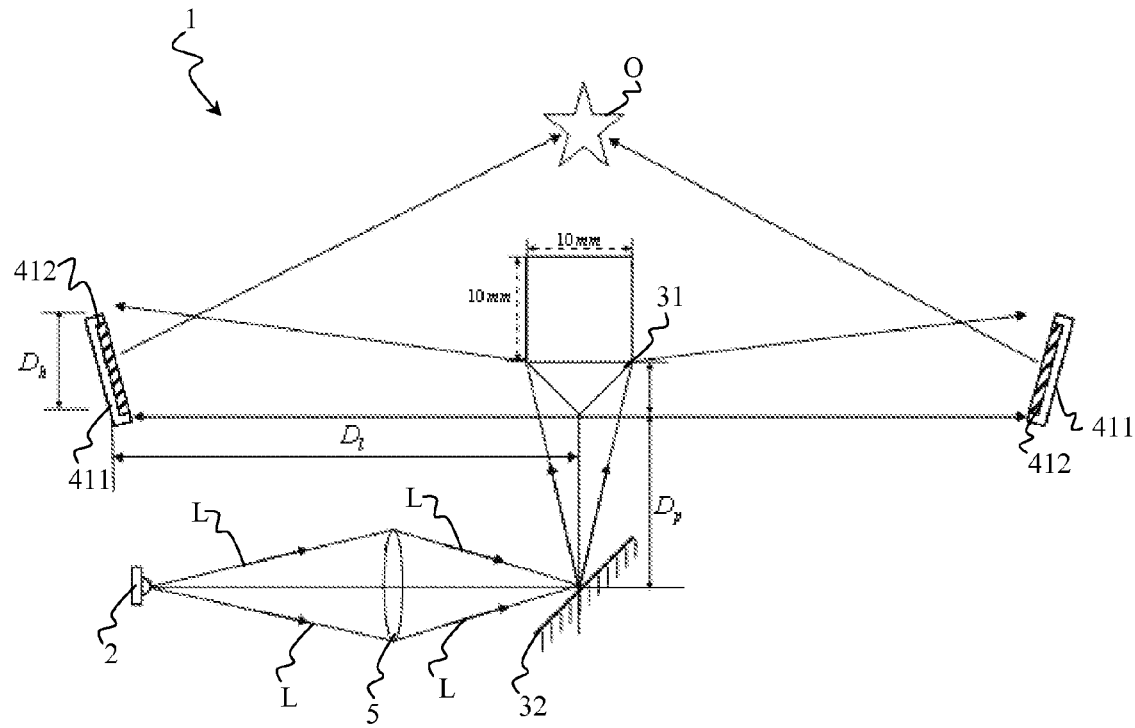
FIG. 14 shows a side view of an experimental setup of an embodiment.
Figure 15:
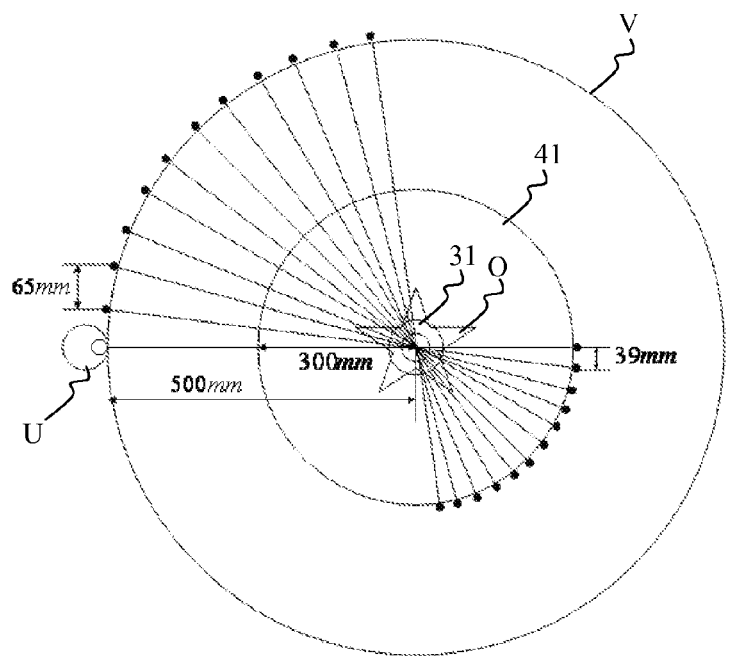
FIG. 15 shows a top view an experimental setup of an embodiment.

To demonstrate proof of the concept, an experimental setup of an embodiment in accordance with this invention was implemented. FIGS. 14 and 15 depict the side and top views, respectively, of this experimental setup, which comprises a LED light source (2), a convex lens (52), a planar mirror (32), a cone mirror (31) and nine phase-only SLMs (41). An LED that had a wavelength of 533 nm was used as light source (2), and the focal length of the convex lens (52) was 150 mm.

A cone mirror (31) that had a diameter of 10 mm was used as axially symmetric mirror (3), and SLMs (41) that included protective mounts (411) were used as spatial light modulation system (4). The resolution of each SLM (41) was 1920×1080 pixels. The physical parameters used in the experimental setup are shown in Table 1.

In this experimental setup, a cone mirror (31) that had a height less than that of the SLM (41) was used. For this reason, a spherical-wave light beam was directed upon the cone mirror (31). The diverging light beam from the LED light source (2) was focused by the convex lens (52) onto the surface of the cone mirror (31). The cone mirror (31) then reflected the light beam over the entire radial range of a horizontal plan. As a result, the resulting asymmetric spherical waves impinged upon the cylindrically configured SLM (41) layer, which consisted of nine planar SLMs (41). The diffracted light beams from the SLMs (41) were then superposed above the cone mirror (31).

TABLE 1

| Experimental Parameters | |
|---|---|
| SLM resolution | 1920 × 1080 pixels |
| SLM pixel interval | 8 μm |
| Light length of the LED | 533 nm |
| Focal length of the convex lens | 150 mm |
| Diameter of the cone mirror | 10 mm |
| Distance between the origin of the spherical wave and the cone mirror | 250 mm |
| Distance between the cone mirror and the SLM | 300 mm |
| SLM tilting angle | 5 degrees |
| SLM interval | 39 mm |

Figure 16:
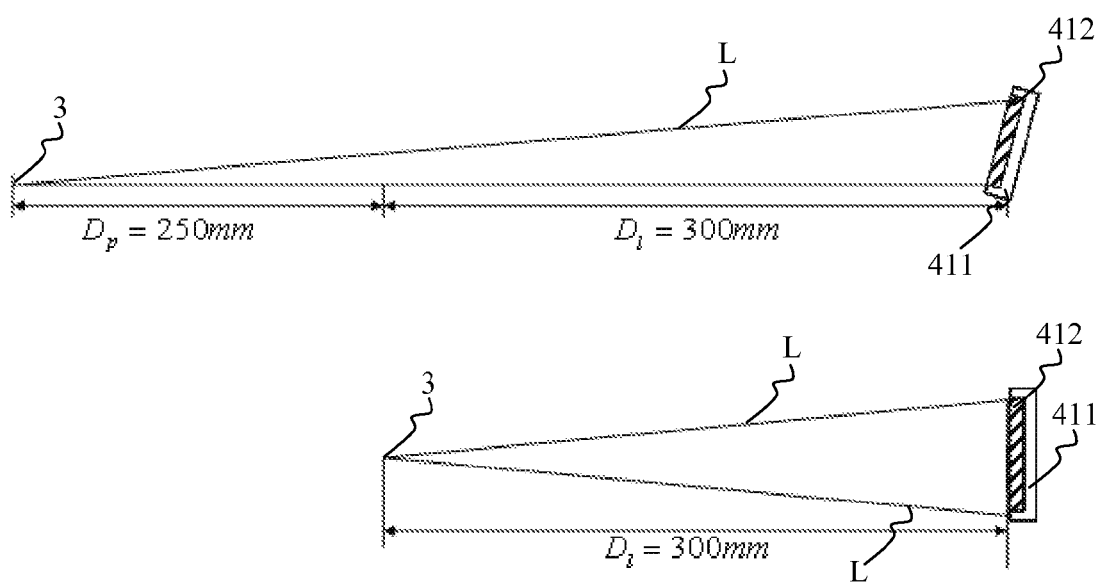
FIG. 16 shows an asymmetric spherical reference wave along the vertical and horizontal directions.

Given the incident spherical light beam, the light beam reflecting from the cone mirror (31) was an asymmetric spherical wave, as depicted in FIG. 16. Nine planar SLMs (41) were placed in a cylindrical configuration at intervals of 39 mm such that a user (U) was able to view the optical reconstruction (O) with both eyes at a distance of 500 mm from the center of the display apparatus (1). Further, the SLMs (41) were tilted by 5 degrees so that the optical reconstruction (O) would be generated above the cone mirror (31). The SLMs (41) included protective mounts (411) covering their active areas (412); consequently, the gap (G) between the active areas (412) of adjacent SLMs (41) comprised (non-active) parts of the protective mounts (41) that housed the adjacent SLMs (41). The nine holographic fringe patterns were generated using the Rayleigh-Sommerfeld integral with an asymmetric spherical reference wave. FIG. 17 depicts an optical reconstruction (O) produced by the apparatus (1). Using this experimental setup, a user (U) was able to view the volumetric optical reconstruction (O) at a desired viewing distance and could move freely without adversely impacting his view of the optical reconstruction (O) within an angle of 90 degrees.

The display apparatus (1) in this experimental setup comprised a plurality of planar spatial light modulators (41) that were configured about a central axis of the display apparatus (1). Furthermore, the respective active areas (412) of the plurality of planar spatial light modulators (41) of the experimental setup covered a solid angle that was less than $2\pi$ steradians. In embodiments of the invention, increasingly more complete and accurate optical reconstructions (O) may be obtained by including greater numbers of planar spatial modulators whose active areas (412) cover increasingly larger solid angles.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An apparatus for holographic display comprising:
   at least one light source for providing a source light beam and characterized by
   at least one axially symmetric convex mirror for reflecting the source light beam and configured to shape the source light beam so that the source light beam propagates radially over the entire radial range for axially symmetric illumination, and
   a spatial light modulation system being hit by the light beam which has been reflected by the axially symmetric convex mirror and has propagated for axially symmetric illumination, having one or more than one spatial light modulators for modulating light reflecting from the axially symmetric convex mirror and forming a desired optical reconstruction above the axially symmetric convex mirror, wherein the one or more than one spatial light modulators of the spatial light modulation system are in a configuration that has a central axis, and wherein the central axis is substantially collinear with the axis of symmetry of the axially symmetric convex mirror.

2. The apparatus according to claim 1, wherein the spatial light modulation system is configured in accordance with a holographic fringe pattern configuration, wherein the holographic fringe pattern configuration comprises a plurality of holographic fringe patterns, wherein at least one of the holographic fringe patterns is dynamically modified and wherein each of the plurality of holographic fringe patterns is associated with a corresponding planar spatial light modulator from among the one or more than one planar spatial light modulators of the spatial modulation system.

3. The apparatus according to claim 1, wherein the one or more than one spatial light modulators of the spatial light modulation system form a parabolic surface.

4. The apparatus according to claim 1, wherein the one or more than one spatial light modulators of the spatial light modulation system form a SLM layer by tiling along a surface.

5. The apparatus according to claim 4, wherein the one or more than one spatial light modulators of the spatial light modulation system are arranged in a cylindrical configuration.

6. The apparatus according to claim 4, wherein the one or more than one spatial light modulators of the spatial light modulation system are tiled in a partially spherical configuration.

7. The apparatus according to claim 4, wherein the one or more than one spatial light modulators of the spatial light modulation system are tiled in a conical configuration.

8. The apparatus according to claim 4, wherein each of the one or more than one spatial light modulators of the spatial light modulation system comprises a transmissive liquid crystal display panel.

9. The apparatus according to claim 4, wherein each of the one or more than one spatial light modulators of the spatial light modulation system comprises a reflective liquid crystal display panel.

10. The apparatus according to claim 4, wherein each of the one or more than one spatial light modulators of the spatial light modulation system comprises a liquid crystal on silicon panel.

11. The apparatus according to claim 4, wherein each of the one or more than one spatial light modulators of the spatial light modulation system comprises a digital micromirror array.

12. The apparatus according to claim 4, wherein at least one of the one or more than one spatial light modulators of the spatial light modulation system comprises a phase-only spatial light modulator.

13. The apparatus according to claim 4, wherein at least one of the one or more than one spatial light modulators of the spatial light modulation system comprises an amplitude-only spatial light modulator.

14. The apparatus according to claim 4, wherein at least one of the one or more than one spatial light modulators of the spatial light modulation system comprises a complex-amplitude spatial light modulator.

15. The apparatus according to claim 4, wherein at least one of the one or more than one spatial light modulators of the spatial light modulation system comprises an optically addressed spatial light modulator.

16. The apparatus according to claim 4, wherein at least one of the one or more than one spatial light modulators of the spatial light modulation system comprises an electrically addressed spatial light modulator.

17. The apparatus according to claim 4, wherein the apparatus further comprises, in correspondence to each of the one or more than one spatial light modulators of the spatial light modulation system, at least one relay optical system.

18. The apparatus according to claim 17, wherein each of the at least one relay optical systems comprises two lenses for eliminating blind spots caused, for each of the one or more than one spatial light modulators of the spatial light modulation system, by a respective edge of a protective mount of the respective one of the one or more than one spatial light modulators of the spatial modulation system.

19. The apparatus according to claim 1, wherein the desired optical reconstruction is formed in a color interlacing manner.

20. The apparatus according to claim 1, wherein the light source is a coherent light source.

21. The apparatus according to claim 20, wherein the light source is a continuous wave laser.

22. The apparatus according to claim 1, wherein the light source is an incoherent light source.

23. The apparatus according to claim 22, wherein the light source is a LED light source with a narrow band-pass filter.

24. The apparatus according to claim 22, wherein the light source is a halogen lamp.

25. The apparatus according to claim 1, wherein the axially symmetric convex mirror is a partially spherical mirror.

26. The apparatus according to claim 1, wherein the axially symmetric convex mirror is a cylindrical mirror.

27. The apparatus according to claim 1, wherein the axially symmetric convex mirror is a conical mirror.

28. The apparatus according to claim 1, further characterized by at least one collimator optical system which comprises a combination of two lenses for collimating the source light beam and at least one pinhole for filtering the undesired high spatial frequency components of the light beam.

29. The apparatus according to claim 28 further comprising, in correspondence to each of the one or more than one spatial light modulators of the spatial light modulation system:
   a respective compensation lens for converting a cylindrical wave that is reflected from the at least one axially symmetric convex mirror to a plane wave so as to compensate for the restricted spatial frequency bandwidth of the cylindrical wave, and
   at least one beam splitter for reflecting the source light beam that reflects from the at least one axially symmetric convex mirror onto the respective compensation lens and the corresponding spatial light modulator of the one or more than one spatial light modulators of the spatial light modulation system.

30. The apparatus according to claim 1, characterized by a collimator optical system which directs the source light beam substantially parallel to or collinear with the axis of symmetry of the axially symmetric convex mirror.

31. The apparatus according to claim 1, wherein each of the one or more spatial light modulators of the spatial light modulation system has an active area that covers an entire side of itself.

32. The apparatus according to claim 31, wherein the active surface area of the one or more than one spatial light modulators of the spatial light modulation system covers a solid angle that is less than $2\pi$ steradians.

33. The apparatus according to claim 1, wherein the one or more than one spatial light modulators of the spatial light modulation system are each tilted from a horizontal axis.

34. An apparatus for holographic display comprising:
at least one light source for providing a source light beam, and characterized by
at least one axially symmetric convex mirror for reflecting the source light beam and configured to shape the source light beam so that the source light beam propagates radially over the entire radial range for axially symmetric illumination,
a spatial light modulation system being hit by the light beam which has been reflected by the axially symmetric convex mirror and has propagated for axially symmetric illumination, having one or more than one spatial light modulators for modulating light reflecting from the axially symmetric convex mirror and forming a desired optical reconstruction, wherein the one or more than one spatial light modulators of the spatial light modulation system are in a configuration selected from the group comprising a cylindrical, a partially spherical and a conical configuration, wherein the configuration has a central axis, and wherein the central axis is substantially collinear with the axis of symmetry of the axially symmetric convex mirror.

* * * * *